US008776936B2

(12) United States Patent
Mimura et al.

(10) Patent No.: US 8,776,936 B2
(45) Date of Patent: Jul. 15, 2014

(54) ELECTRIC VEHICLE HAVING SWING ARM WITH MOTOR

(75) Inventors: Masahide Mimura, Wako (JP); Keiichiro Niizuma, Wako (JP); Hitoshi Suzuki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 382 days.

(21) Appl. No.: 13/256,173

(22) PCT Filed: Feb. 12, 2010

(86) PCT No.: PCT/JP2010/052065
§ 371 (c)(1),
(2), (4) Date: Sep. 12, 2011

(87) PCT Pub. No.: WO2010/109970
PCT Pub. Date: Sep. 30, 2010

(65) Prior Publication Data
US 2012/0000724 A1    Jan. 5, 2012

(30) Foreign Application Priority Data

Mar. 27, 2009    (JP) .................................. 2009-079175

(51) Int. Cl.
*B60K 1/00*    (2006.01)
*F16D 43/18*    (2006.01)
*B62M 7/12*    (2006.01)
*B62K 25/00*    (2006.01)
*B60K 7/00*    (2006.01)
*B60K 17/04*    (2006.01)

(52) U.S. Cl.
CPC ........... *B62K 25/005* (2013.01); *Y02T 10/7258* (2013.01); *B60L 2200/24* (2013.01); *B60K 2007/0038* (2013.01); *B62K 2202/00* (2013.01); *F16D 43/18* (2013.01); *B60K 17/043* (2013.01); *B60W 2300/365* (2013.01); *B62M 7/12* (2013.01); *B62K 2204/00* (2013.01); *B60Y 2200/126* (2013.01); *B60K 7/0007* (2013.01)
USPC .......................................... 180/291; 180/220

(58) Field of Classification Search
USPC ............ 180/291, 65.1, 65.31, 292, 297, 65.6, 180/220
See application file for complete search history.

(56) References Cited

U.S. PATENT DOCUMENTS 4,345,664 A * 8/1982 Anno et al. .................... 180/230
4,567,958 A * 2/1986 Ishihara ........................ 180/230
(Continued)

FOREIGN PATENT DOCUMENTS

JP      4292284 A    10/1992
JP      5139365 A    6/1993
(Continued)

*Primary Examiner* — Katy M Ebner
*Assistant Examiner* — Brodie Follman
(74) *Attorney, Agent, or Firm* — Birch, Stewart, Kolasch & Birch, LLP (57) ABSTRACT

Provided is an electric vehicle that is easy to start to move even when there is load applied, and which does not generate rotational resistance of the electric motor when the vehicle is push-walked. A connection/disconnection mechanism is provided between the electric motor (50) and the speed reducing mechanism (70) to switch transmission of the rotating driving force from a disabled state to an enabled state when the electric motor (50) rotates at a predetermined rotation speed or more. The connection/disconnection mechanism is a centrifugal clutch (40). The swing arm (12) is configured as a cantilever-type, supported only at the left side in the vehicle width direction, so that the centrifugal clutch (40), the electric motor (50), and the speed reducing mechanism (70) are arranged in this order, from the left side in the vehicle width direction.

15 Claims, 9 Drawing Sheets

(56) References Cited

U.S. PATENT DOCUMENTS

| | | | |
|---|---|---|---|
| 4,697,664 A * | 10/1987 | Kohyama | 180/226 |
| 4,830,163 A * | 5/1989 | Miyazaki et al. | 192/105 CD |
| 5,101,924 A * | 4/1992 | Yamagiwa et al. | 180/220 |
| 5,222,572 A * | 6/1993 | Yamagiwa et al. | 180/220 |
| 5,406,154 A * | 4/1995 | Kawaguchi et al. | 310/67 R |
| 5,421,427 A * | 6/1995 | Ogawa et al. | 180/220 |
| 5,818,134 A * | 10/1998 | Yang et al. | 310/78 |
| 5,900,686 A * | 5/1999 | Tabata et al. | 310/71 |
| 6,109,127 A * | 8/2000 | Liau | 74/336 B |
| 6,155,366 A * | 12/2000 | Lin | 180/65.25 |
| 6,276,481 B1 * | 8/2001 | Matsuto et al. | 180/220 |
| 6,547,024 B2 * | 4/2003 | Ohyama et al. | 180/227 |
| 6,590,306 B2 * | 7/2003 | Terada | 310/75 C |
| 7,182,167 B2 * | 2/2007 | Sasamoto | 180/219 |
| 7,210,550 B2 * | 5/2007 | Yonehana et al. | 180/220 |
| 7,237,638 B2 * | 7/2007 | Ishikawa et al. | 180/219 |
| 7,249,644 B2 * | 7/2007 | Honda et al. | 180/65.51 |
| 7,255,188 B2 * | 8/2007 | Tsukada et al. | 180/65.51 |
| 7,290,629 B2 * | 11/2007 | Ozeki et al. | 180/65.23 |
| 7,351,265 B2 * | 4/2008 | Vitale et al. | 180/65.51 |
| 7,497,288 B2 * | 3/2009 | Tsukada et al. | 180/68.1 |
| 7,671,503 B2 * | 3/2010 | Naito et al. | 310/191 |
| 7,800,277 B2 * | 9/2010 | Kaminokado | 310/268 |
| 7,931,110 B2 * | 4/2011 | Nishiura et al. | 180/220 |
| 8,002,062 B2 * | 8/2011 | Saitou | 180/68.3 |
| 8,002,067 B2 * | 8/2011 | Nishiura et al. | 180/220 |
| 8,028,785 B2 * | 10/2011 | Kanno et al. | 180/220 |
| 8,167,070 B2 * | 5/2012 | Takamura et al. | 180/68.5 |
| 8,360,188 B2 * | 1/2013 | Yonehana et al. | 180/220 |
| 8,443,926 B2 * | 5/2013 | Kanno et al. | 180/220 |
| 8,499,867 B2 * | 8/2013 | Marcacci et al. | 180/65.285 |
| 8,534,408 B2 * | 9/2013 | Kajihara et al. | 180/220 |
| 8,627,915 B2 * | 1/2014 | Tsukamoto et al. | 180/222 |
| 8,640,810 B2 * | 2/2014 | Tsukamoto et al. | 180/220 |
| 2001/0034280 A1 * | 10/2001 | Kuga et al. | 474/8 |
| 2004/0079574 A1 * | 4/2004 | Ono et al. | 180/252 |
| 2004/0238242 A1 * | 12/2004 | Honda et al. | 180/65.1 |
| 2004/0238253 A1 * | 12/2004 | Yonehana et al. | 180/219 |
| 2005/0087376 A1 * | 4/2005 | Tsukada et al. | 180/65.2 |
| 2005/0109554 A1 * | 5/2005 | Ishikawa et al. | 180/312 |
| 2005/0121245 A1 * | 6/2005 | Tsukada et al. | 180/230 |
| 2005/0177285 A1 * | 8/2005 | Honda | 701/22 |
| 2006/0289214 A1 * | 12/2006 | Katsuhiro et al. | 180/65.4 |
| 2007/0023219 A1 * | 2/2007 | Aoyama | 180/220 |
| 2007/0026982 A1 * | 2/2007 | Aoyama | 474/14 |
| 2009/0020352 A1 | 1/2009 | Horii et al. | |
| 2010/0078237 A1 * | 4/2010 | Yonehana et al. | 180/65.51 |
| 2010/0078248 A1 * | 4/2010 | Kanno et al. | 180/220 |
| 2010/0078249 A1 * | 4/2010 | Nishiura et al. | 180/220 |
| 2010/0078251 A1 * | 4/2010 | Nishiura et al. | 180/229 |
| 2010/0163326 A1 * | 7/2010 | Takamura et al. | 180/68.5 |
| 2011/0024206 A1 * | 2/2011 | Sagara et al. | 180/65.1 |
| 2011/0139531 A1 * | 6/2011 | Kanno et al. | 180/220 |
| 2011/0290578 A1 * | 12/2011 | Nishiura et al. | 180/291 |
| 2012/0000724 A1 * | 1/2012 | Mimura et al. | 180/291 |
| 2012/0048630 A1 * | 3/2012 | Nishiura et al. | 180/65.31 |
| 2012/0080254 A1 * | 4/2012 | Tsukamoto et al. | 180/68.5 |
| 2013/0175102 A1 * | 7/2013 | Tsukamoto et al. | 180/21 |
| 2013/0228389 A1 * | 9/2013 | Nakashima et al. | 180/220 |
| 2013/0284527 A1 * | 10/2013 | Murakami et al. | 180/55 |

FOREIGN PATENT DOCUMENTS

| | | |
|---|---|---|
| JP | 11034965 A | 2/1999 |
| JP | 2003127966 A | 5/2003 |
| JP | 2004122981 A | 4/2004 |
| JP | 2004358982 A | 12/2004 |
| JP | 2008221976 A | 9/2008 |
| JP | 2009023449 A | 2/2009 |
| KP | 10-0220033 B1 | 6/1999 |

* cited by examiner

ELECTRIC VEHICLE HAVING SWING ARM WITH MOTOR

TECHNICAL FIELD

The present invention relates to an electric vehicle, and particularly, to an electric vehicle that drives a driving wheel using an electric motor.

BACKGROUND ART

Conventionally, there is known an electric vehicle that drives a driving wheel using an electric motor.

Patent document 1 discloses an electric vehicle in which an electric motor is disposed inside a swing arm rotatably supporting a rear wheel and a speed reducing gear set is interposed between the electric motor and an axle of the rear wheel to perform a first stage speed reduction.

Further, Patent Document 2 discloses an electric vehicle in which an electric motor is disposed inside a swing arm rotatably supporting a rear wheel and a speed reducing gear set and a one-way clutch are interposed between the electric motor and an axle of the rear wheel.

CITATION LIST

Patent Document

[Patent Document 1] Japanese Unexamined Patent Application Publication No. 2004-358982
[Patent Document 2] Japanese Unexamined Patent Application Publication No. 2003-127966

SUMMARY OF INVENTION

Technical Problem

Incidentally, the electric motor is known to have characteristics that the rotation of the electric motor is easy to control after the electric motor starts to rotate but cannot start to rotate when a load greater than a starting torque of the electric motor is applied. This problem may be solved when the output of the electric motor is sufficiently great. However, in a small-sized vehicle such as a bicycle and particularly an electric bicycle in which an electric motor is accommodated inside a swing arm rotatably journaling a rear wheel and swingably attached to a vehicle body frame, a large electric motor cannot be used due to the problem relating to an attachment space or an increase in weight, so that the above-described phenomenon occurs.

In the electric vehicle disclosed in Patent Document 1, since the electric motor and a driving wheel are directly coupled to each other by the speed reducing gear set, there is a possibility that the electric vehicle is difficult to start to move when the weight of the vehicle is large or the vehicle is on a sloping road due to the above-described characteristics of the electric motor. Further, when a rider walks pushing the vehicle without generating a rotational driving force in the electric motor, a problem arises in that a rotational resistance of the electric motor is generated, so this gets the vehicle heavy when the rider walks pushing the vehicle.

Further, in the electric vehicle disclosed in Patent Document 2, since the one-way clutch is provided, no rotational resistance is generated when the rider walks pushing the vehicle forward. However, it is still problematic in that a situation occurs in which the vehicle is difficult to start to move at the time of starting and the rotational resistance is generated when the vehicle moves backward because the one-way clutch connects the rear wheel to the motor. Further, when the vehicle starts to move on a sloping road or the like, the same problem as that of the electric vehicle disclosed in Patent Document 1 arises.

An object of the present invention is to provide an electric vehicle that solves the above-described problem of the prior art, easily starts to move even under load, and prevents generation of the rotational resistance of an electric motor when a rider walks pushing the electric vehicle.

Solution to Problem

To achieve the above objects, the present invention has a first feature in that a disconnection/connection mechanism is provided between said electric motor and said rear wheel to disable transmission of the rotational driving force until said electric motor rotates at a predetermined revolution or more when the vehicle starts to move.

The present invention has a second feature in that the rotational driving force of said electric motor is transmitted to said speed reducing mechanism through said disconnection/connection mechanism, and is transmitted from said speed reducing mechanism to said rear wheel.

The present invention has a third feature in that the disconnection/connection mechanism is a centrifugal clutch.

The present invention has a fourth feature in that said electric motor is an inner rotor type motor which includes a stator fixed to said swing arm and a rotor fixed to a cylindrical motor driving shaft, said centrifugal clutch includes a drive plate which is provided with a clutch shoe of said centrifugal clutch and a clutch outer which is rotated by a friction force of said clutch shoe, said drive plate is fixed to one end of said motor driving shaft, an output shaft having said clutch outer fixed thereto is rotatably inserted through said motor driving shaft, and said output shaft is configured to transmit the rotational driving force to said speed reducing mechanism.

The present invention has a fifth feature in that said swing arm is of a cantilever type provided only at the left side in the width direction of the vehicle, and said centrifugal clutch, said electric motor, and said speed reducing mechanism are provided in this order from the left side of said swing arm in the width direction of the vehicle.

The present invention has a sixth feature in that said swing arm is of a cantilever type provided only at the left side in the width direction of the vehicle, and said speed reducing mechanism, said electric motor, and said centrifugal clutch are provided in this order, from the left side of said swing arm in the width direction of the vehicle.

The present invention has a seventh feature in that a stator cover which is fixed to said swing arm and covers said stator, wherein said stator cover is provided with a bearing, and wherein said output shaft is supported at two points on the left and right sides of said electric motor in the width direction of the vehicle through a bearing formed at said swing arm at one side of said electric motor in the width direction of the vehicle and said bearing formed at said stator cover.

Advantageous Effects of Invention

According to the first feature, a disconnection/connection mechanism is provided between said electric motor and said rear wheel to disable transmission of the rotational driving force until said electric motor rotates at a predetermined revolution or more when the vehicle starts to move. Therefore, when the electric motor starts to rotate from a stop state, the transmission of the rotational driving force is in a disabled state. Accordingly, even when the vehicle starts to move on a sloping road or under the vehicle's weight being large, the electric motor starts to smoothly rotate in a no-load state, and then the rotation speed reaches or exceeds a predetermined revolution where the motor torque appears, the transmission of the rotational driving force starts, so that the vehicle can smoothly start to move. Further, since the disconnection/connection mechanism is in disconnection until the electric motor rotates at a predetermined revolution or more, any load is not caused by the rotational resistance of the electric motor when the rider walks pushing the vehicle.

According to the second feature, the rotational driving force of said electric motor is transmitted to said speed reducing mechanism through said disconnection/connection mechanism, and is transmitted from said speed reducing mechanism to said rear wheel. Therefore, when the electric motor rotates at a speed below a predetermined revolution, the rotational driving force is not transmitted to the speed reducing mechanism, and the electric motor may be smoothly rotated.

According to the third feature, since the disconnection/connection mechanism is a centrifugal clutch, the disconnection/connection mechanism may be obtained with a simple configuration.

According to the fourth feature, said electric motor is an inner rotor type motor which includes a stator fixed to said swing arm and a rotor fixed to a cylindrical motor driving shaft, said centrifugal clutch includes a drive plate which is provided with a clutch shoe of said centrifugal clutch and a clutch outer which is rotated by a friction force of said clutch shoe, said drive plate is fixed to one end of said motor driving shaft, an output shaft having said clutch outer fixed thereto is rotatably inserted through said motor driving shaft, and said output shaft is configured to transmit the rotational driving force to said speed reducing mechanism. Therefore, the rotational driving force output to the left side (right side) of the electric motor in the width direction of the vehicle may be transmitted to the speed reducing mechanism provided at the right side (left side) of the electric motor in the width direction of the vehicle through the centrifugal clutch, and the rotational driving force may be transmitted from the electric motor to the rear wheel by efficiently using the space inside the swing arm.

According to the fifth feature, said swing arm is of a cantilever type provided only at the left side in the width direction of the vehicle, and said centrifugal clutch, said electric motor, and said speed reducing mechanism are provided in this order from the left side of said swing arm in the width direction of the vehicle. Therefore, the heavy electric motor may be disposed near the center of the vehicle body. Further, since the centrifugal clutch with an outer diameter smaller than that of the electric motor is disposed at the left end of the vehicle body, the projection amount of the swing arm projecting toward the side portion of the vehicle body may be made small. Furthermore, the electric motor, the speed reducing mechanism, and the disconnection/connection mechanism are intensively disposed at the side portion of the rear wheel, and the space inside the swing arm may be efficiently used.

According to the sixth feature, said swing arm is of a cantilever type provided only at the left side in the width direction of the vehicle, and said speed reducing mechanism, said electric motor, and said centrifugal clutch are provided in this order, from the left side of said swing arm in the width direction of the vehicle. Therefore, the speed reducing mechanism may be disposed outside of the electric motor in the width direction of the vehicle, and the projection amount of the swing arm projecting toward the side portion of the vehicle body may be made small. Further, the electric vehicle may be obtained in which the electric motor, the speed reducing mechanism, and the centrifugal clutch are disposed inside the cantilever-type arm and which concentrates mass and facilitates the attachment/detachment of the rear wheel. Furthermore, the electric motor, the speed reducing mechanism, and the disconnection/connection mechanism are intensively disposed at the side portion of the rear wheel, and the space inside the swing arm may be efficiently used.

According to the seventh feature, a stator cover which is fixed to said swing arm and covers said stator, wherein said stator cover is provided with a bearing, and wherein said output shaft is supported at two points on the left and right sides of said electric motor in the width direction of the vehicle through a bearing formed at said swing arm at one side of said electric motor in the width direction of the vehicle and said bearing formed at said stator cover. Therefore, the output shaft may be supported at two points on the left and right sides of the electric motor, and a small bearing may be used compared to, for example, a one-sided one-point support structure.

DESCRIPTION OF EMBODIMENTS

Figure 1:
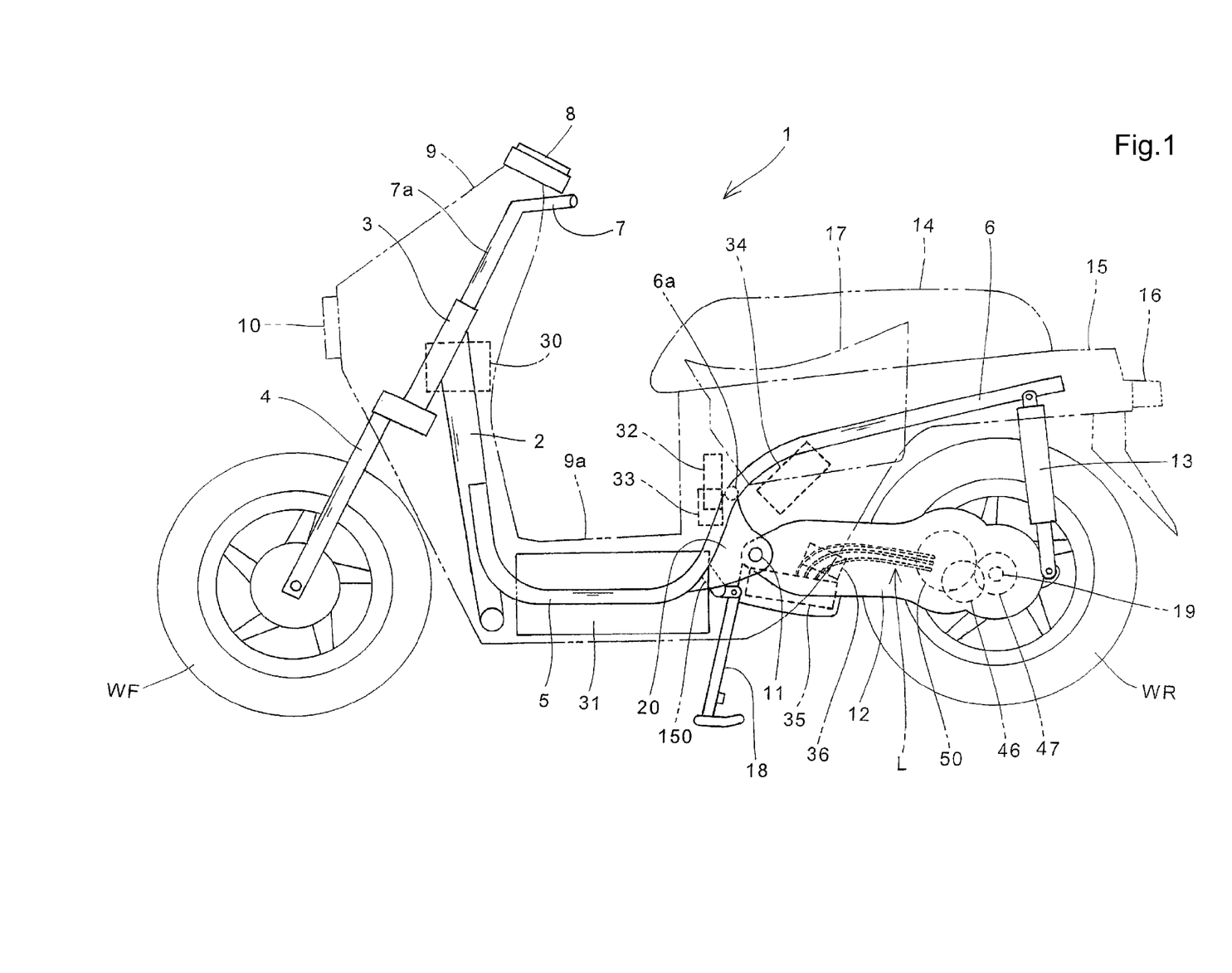
FIG. 1 is a side view illustrating an electric vehicle according to an embodiment of the present invention.
Figure 2:
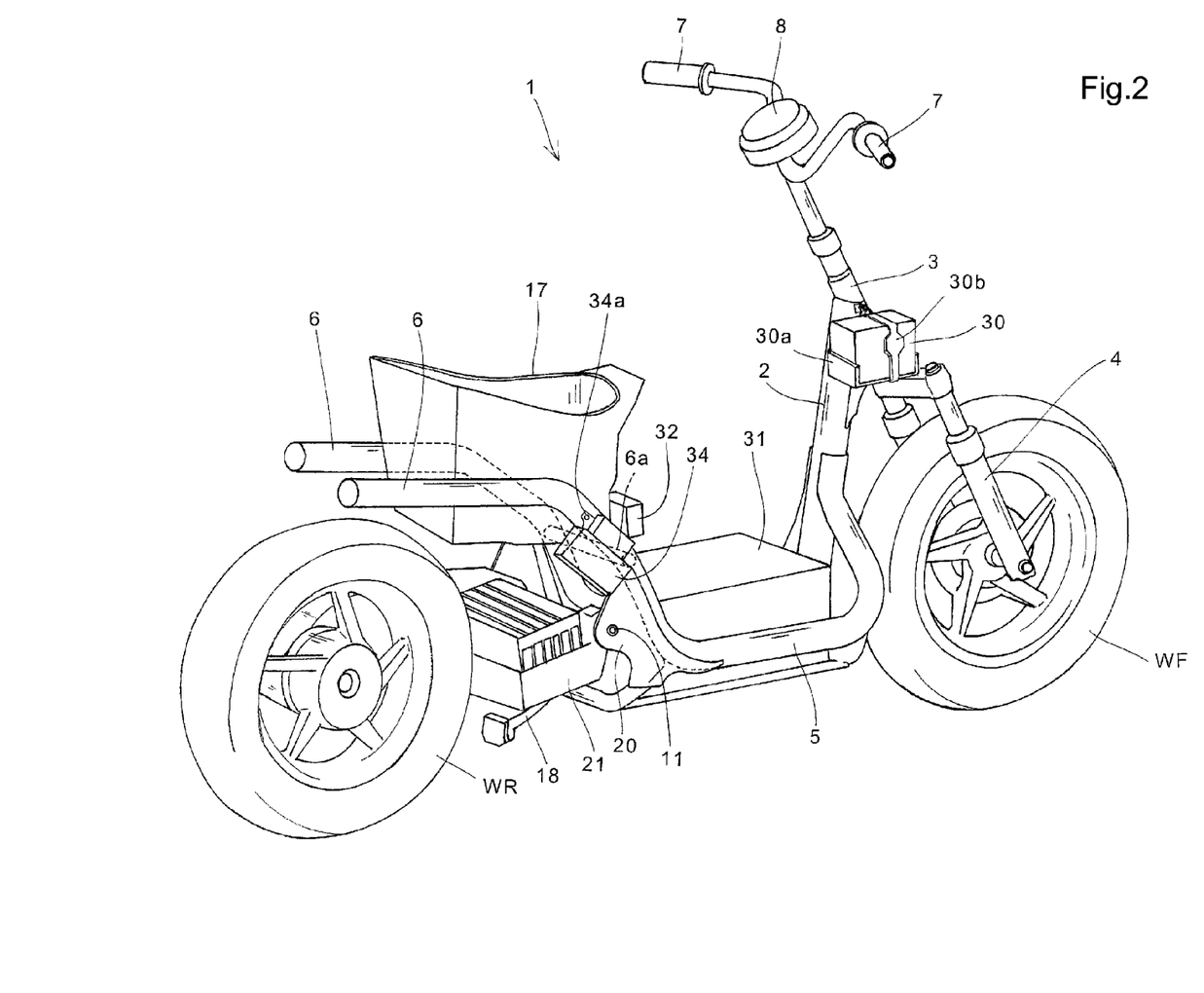
FIG. 2 is a perspective view illustrating the electric vehicle.

Hereinafter, preferred embodiments of the present invention will be described in detail by referring to the drawings. FIG. 1 is a side view illustrating an electric straddled vehicle 1 according to an embodiment of the present invention. Further, FIG. 2 is a rear perspective view illustrating the electric vehicle 1 from which an exterior component is detached. The electric vehicle 1 is a scooter-type electric bicycle with a low floor 9a, and is configured to drive a rear wheel WR using a rotational driving force of an electric motor 50 (refer to FIG. 4) built in a swing arm 12. Furthermore, a high-voltage battery 31 supplying power to the electric motor 50 may be charged in a manner such that an external power supply is connected to a charging port (not show) provided in a vehicle body.

A head pipe 3 is coupled to the front end portion of a main frame 2 to rotatably journal a steering stem 7a. A steering handle 7 is attached to the upper portion of the steering stem 7a, and a pair of left and right front forks 4 is attached to one lower portion thereof. A front wheel WF is rotatably journaled to the lower end portion of the front fork 4.

A pair of left and right lower frames 5 is connected to the lower side of the main frame 2, and the high-voltage battery 31 (for example, 72 V) supplying power to the electric motor 50 is disposed to be interposed between the left and right lower frames 5. The rear side of the lower frame 5 is bent toward the upside of the vehicle body to be connected to a rear frame 6 that supports a loading room 17 and the like.

A pivot plate 20 with a swing arm pivot 11 is attached to the rear portion of the lower frame 5. A front end portion of a cantilever-type swing arm 12 is swingably journaled to the swing arm pivot 11 to support the rear wheel WR using only the left arm in the width direction of the vehicle. The rear wheel WR is rotatably journaled to the rear portion of the swing arm 12 using an axle 19, and the rear end portion of the swing arm 12 is suspended from the rear frame 6 through a rear shock unit 13.

A motor driver (or a power drive unit (PDU)) 35 is disposed at the lower portion of the swing arm 12 to convert a DC current supplied from the high-voltage battery 31 into an AC current and supply the AC current to the electric motor 50. The power supplied from the motor driver 35 is supplied to the electric motor 50 through three power supply lines L. A first speed reducing gear 46 and a second speed reducing gear 47 of a speed reducing mechanism to be described later are disposed at the rear side of the electric motor 50, and the rear wheel WR is driven by the axle 19 fixed to the second speed reducing gear 47. Further, a smoothing capacitor 36 is disposed around the motor driver 35.

A front cowl 9 as an exterior component is provided at the front side of the vehicle body in the steering handle 7, and a meter unit 8 including a speed meter and the like is attached to the upper portion of the front cowl. A headlamp 10 is provided at the front side of the vehicle body in the front cowl 9. Further, the low floor 9a is provided at the upper portion of the high-voltage battery 31 so that a passenger puts feet thereon, and a seat cowl 15 is provided outside the rear frame 6. A seat 14 is attached to the upper portion of the seat cowl 15 so that the seat is opened or closed through a hinge provided at the front side of the vehicle body. Further, a tail lamp unit 16 is attached to the rear end portion of the seat cowl 15. A center stand 18 with two leg portions spaced from each other in the width direction of the vehicle is attached to the pivot plate 20. The center stand 18 is rotatably journaled to a stand bracket 150 that is coupled to the lower frame 5 at the inside of the pivot plate 20 in the width direction of the vehicle.

A low-voltage battery 30 (for example, 12 V) is disposed at the right side of the head pipe 3 in the width direction of the vehicle to supply power to electric auxiliary machinery such as the headlamp 10 or a control device. The low-voltage battery 30 is charged by the power of the high-voltage battery 31. A DC-DC converter 32 and a contactor box 33 are disposed at the front side of the loading room 17 on the inside of the seat cowl 15, where the DC-DC converter is configured to convert a high voltage (72 V) of the high-voltage battery 31 into a low voltage (12 V) and the contactor box accommodates a fuse, a relay, or the like. Furthermore, a control device (a managing unit (MGU)) 34 is attached to the outside of the right rear frame 6 in the width direction of the vehicle through an attachment stay 34a to control the motor driver 35 and the like.

Figure 7:
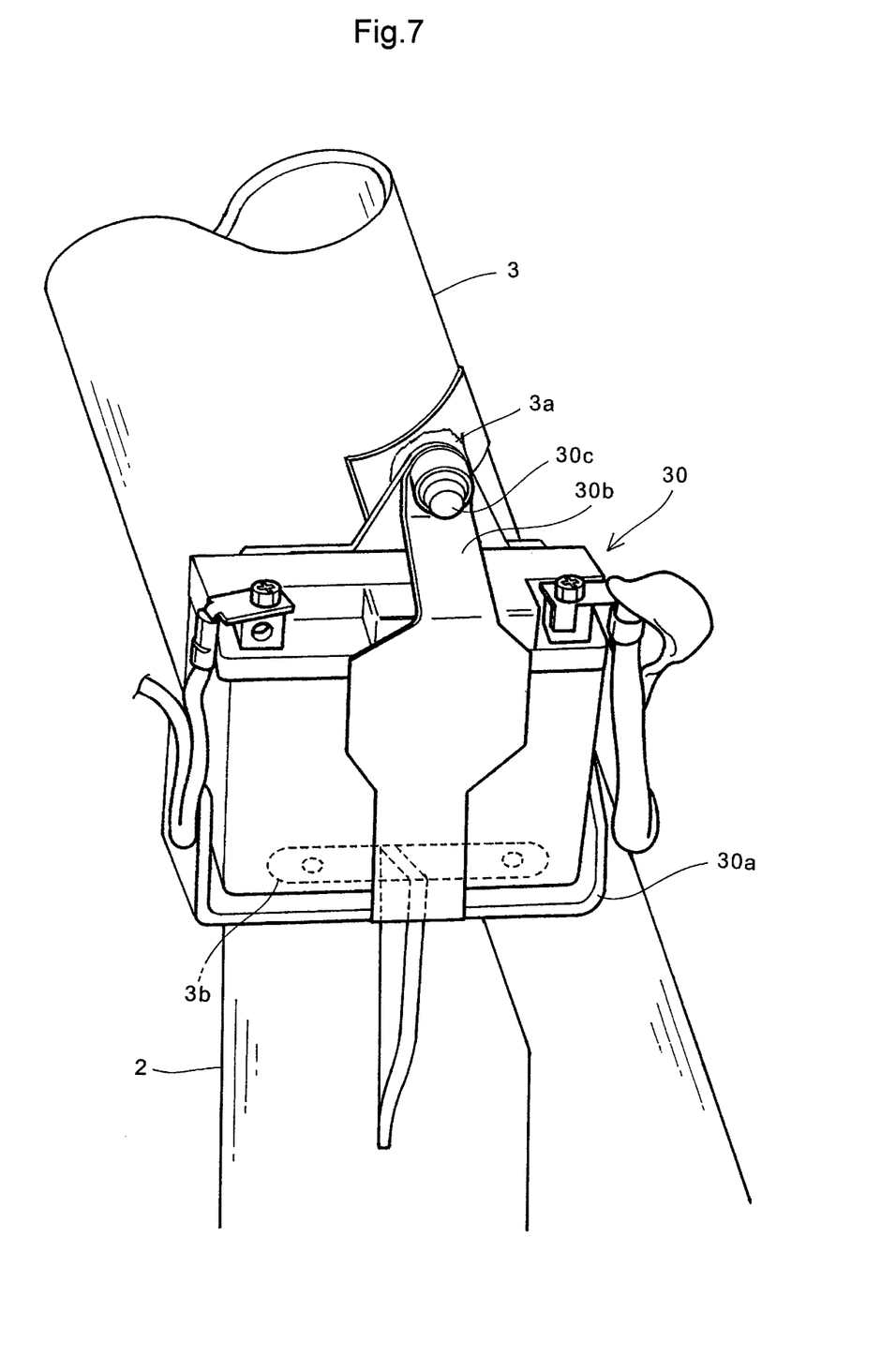
FIG. 7 is a perspective view illustrating an attachment structure of the low-voltage battery.

Referring to FIG. 7, the attachment structure of the low-voltage battery 30 will be described. The low-voltage battery 30 is disposed at the side portion of the head pipe 3 while being accommodated in a battery casing 30a. The battery casing 30a is fixed to a lower stay 3b welded to the main frame 2 and an upper stay 3a welded to the head pipe 3. A boss with a screw hole is formed in the upper stay 3a, and the low-voltage battery 30 is disposed at a predetermined position in a manner such that the low-voltage battery 30 is accommodated in the battery casing 30a, and an upper portion of a pressing plate 30b extending from the lower portion of the battery casing 30a is fixed to the upper stay 3a through a fastening screw 30c.

Figure 8:
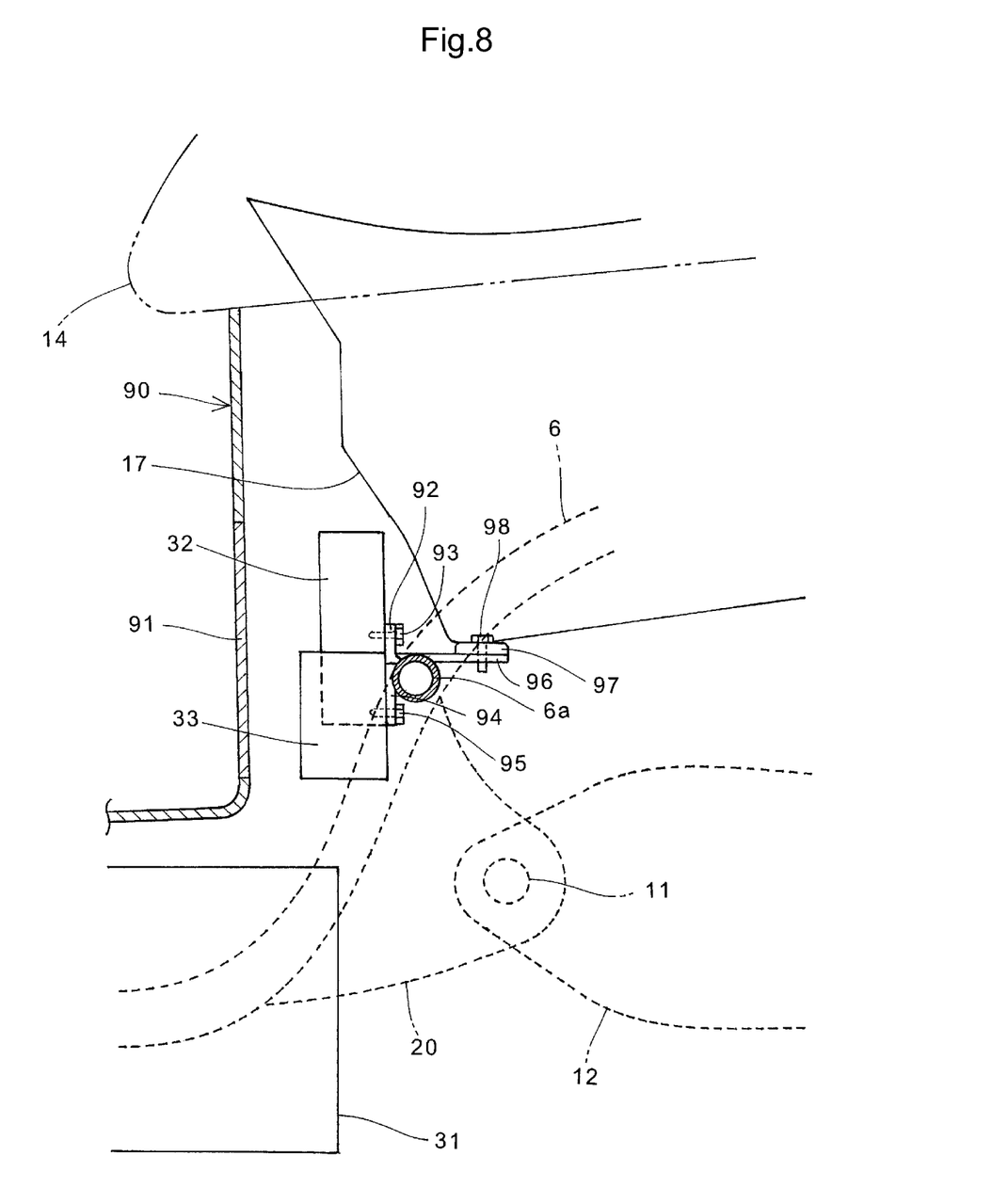
FIG. 8 is a partially enlarged view of FIG. 1.

Referring to FIG. 8, the attachment structure of the DC-DC converter 32 and the like will be described. A cross member 6a is disposed at the rear side of the vehicle body in the DC-DC converter 32 and the contactor box 33 to connect the left and right rear frames 6 to each other. The cross member 6a is attached with an attachment stay 92 supporting the DC-DC converter 32 and having a vertically symmetric shape, an attachment stay 94 extending downward to support the contactor box 33, and an attachment stay 96 extending backward to support the front end portion of the loading room 17.

The DC-DC converter 32 is fixed to the attachment stay 92 through an attachment screw 93 which is threaded thereinto from the rear side of the vehicle body, and the contactor box 33 is fixed to the attachment stay 94 through an attachment screw 95 which is threaded thereinto from the rear side of the vehicle body. Further, the loading room 17 is fixed to an attachment boss 97 and an attachment stay 96 at the front end portion thereof through an attachment screw 98 which is threaded thereinto from the upside. Furthermore, the cross member 6a may be provided with a plurality of support portions for the loading room 17. Further, a maintenance lid 91 is provided at the front side of the vehicle body in the DC-DC converter 32 and the contactor box 33 so that a part of an exterior member 90 is able to be opened or closed.

Figure 3:
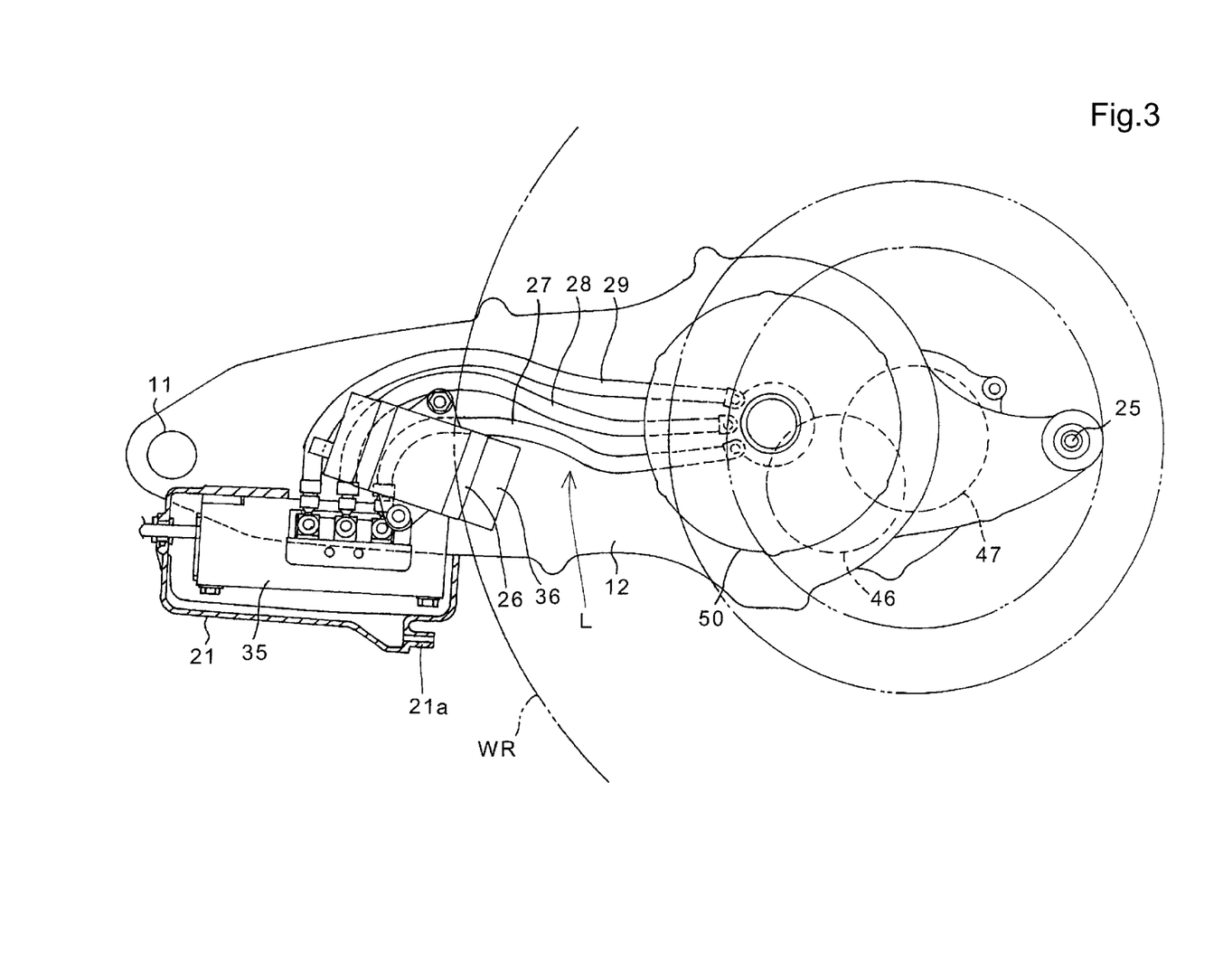
FIG. 3 is a side view illustrating a swing arm.

FIG. 3 is a side view illustrating the swing arm 12. The same reference numerals respectively indicate the same or equivalent components. The motor driver 35 is accommodated in an accommodation space that is provided at the lower surface side of the swing arm 12. The accommodation space is configured in a manner such that a closed space is formed by attaching a cover member 21 from the downside of the vehicle body using a screw or the like. A draining hole 21a is provided at the lower portion of the cover member 21 to discharge moisture to the rear side of the vehicle body.

As shown in FIG. 1, the electric vehicle 1 includes the center stand 18 which has a rotary shaft in the vehicle body frame. The center stand 18 is configured in such a manner that the left leg portion in the width direction of the vehicle contacts the lower surface of the casing member when the center stand 18 is retracted. Accordingly, a cover member 21 may be protected from stones or the like through the center stand 18 when the vehicle runs. This allows the swing arm 12 to decrease in weight since there is no need to excessively thicken the cover member 21.

Figure 9:
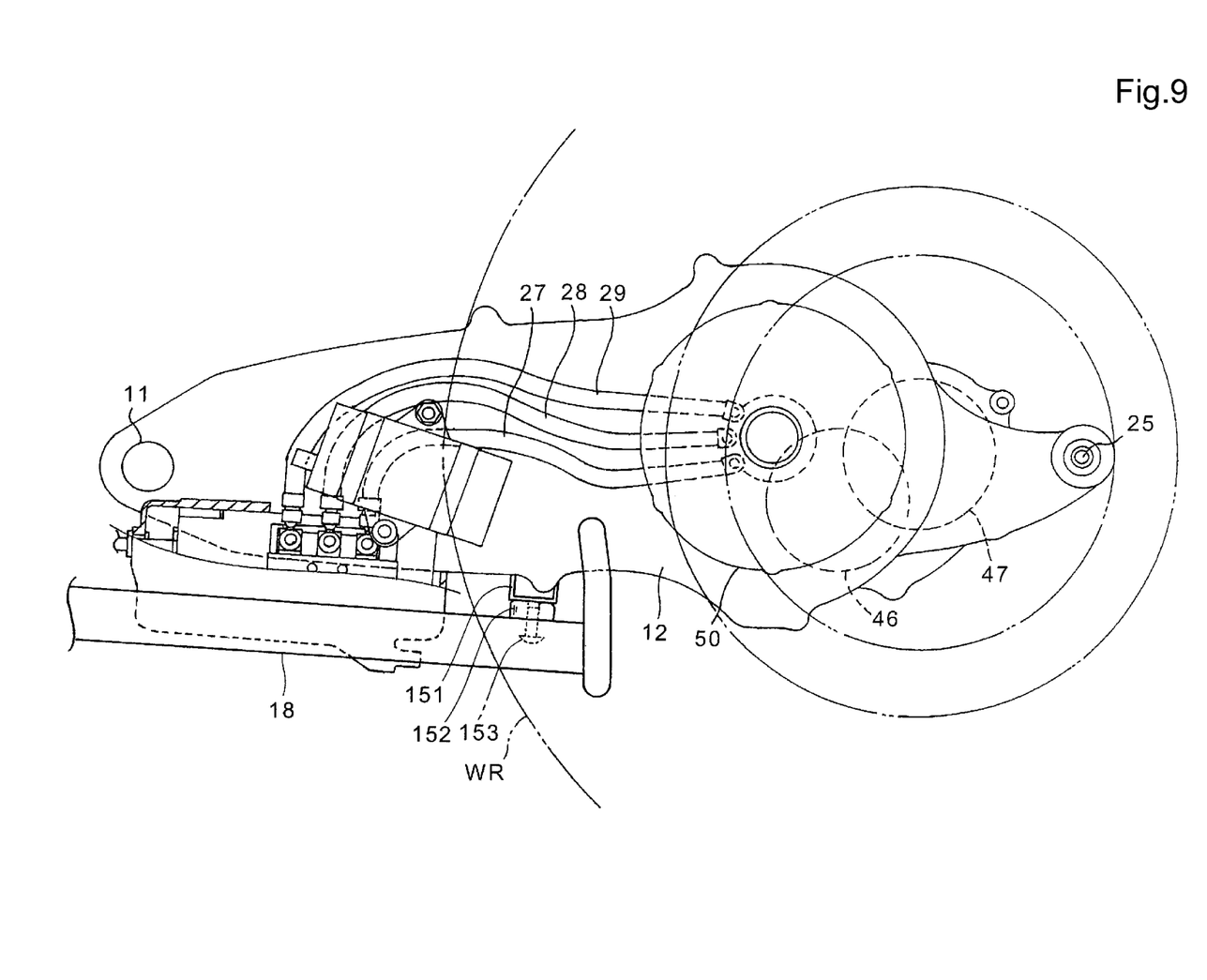
FIG. 9 is a side view illustrating a swing arm when the center stand is retracted.

Referring to FIG. 9, a rubber member 152 is attached to the left leg portion of the center stand 18 in the width direction of the vehicle through an attachment screw 153. A biasing force is applied to the center stand 18 through a spring or the like in the retracting direction, and when the center stand is retracted, the rubber member 152 keeps in contact with a stand stopper 151.

Returning to FIG. 3, the electric motor 50 is disposed in a space inside the swing arm 12 to overlap the projection area of the rear wheel WR in a side view of the vehicle body. A U-phase interconnection 27, a V-phase interconnection 28, and a W-phase interconnection 29 serving as power supply lines L are wired between the motor driver 35 and the electric motor 50. A first speed reducing gear 46 and a second speed reducing gear 47 of a speed reducing mechanism are disposed at the rear side of the electric motor 50, and the rear wheel WR is driven by the axle 19 (refer to FIG. 1) which is a rotary shaft of a speed reducing gear 24. Furthermore, a rear shock unit attachment portion 25 is provided at the rear end portion of the swing arm 12 to swingably journal a lower end portion of a rear shock unit 13.

Furthermore, a smoothing capacitor 36 is disposed at the side portion of the motor driver 35 to remove a vibration of a voltage waveform. The smoothing capacitor 36 is fixed to the inner wall surface of the swing arm 12 through an attachment stay 26.

Figure 4:
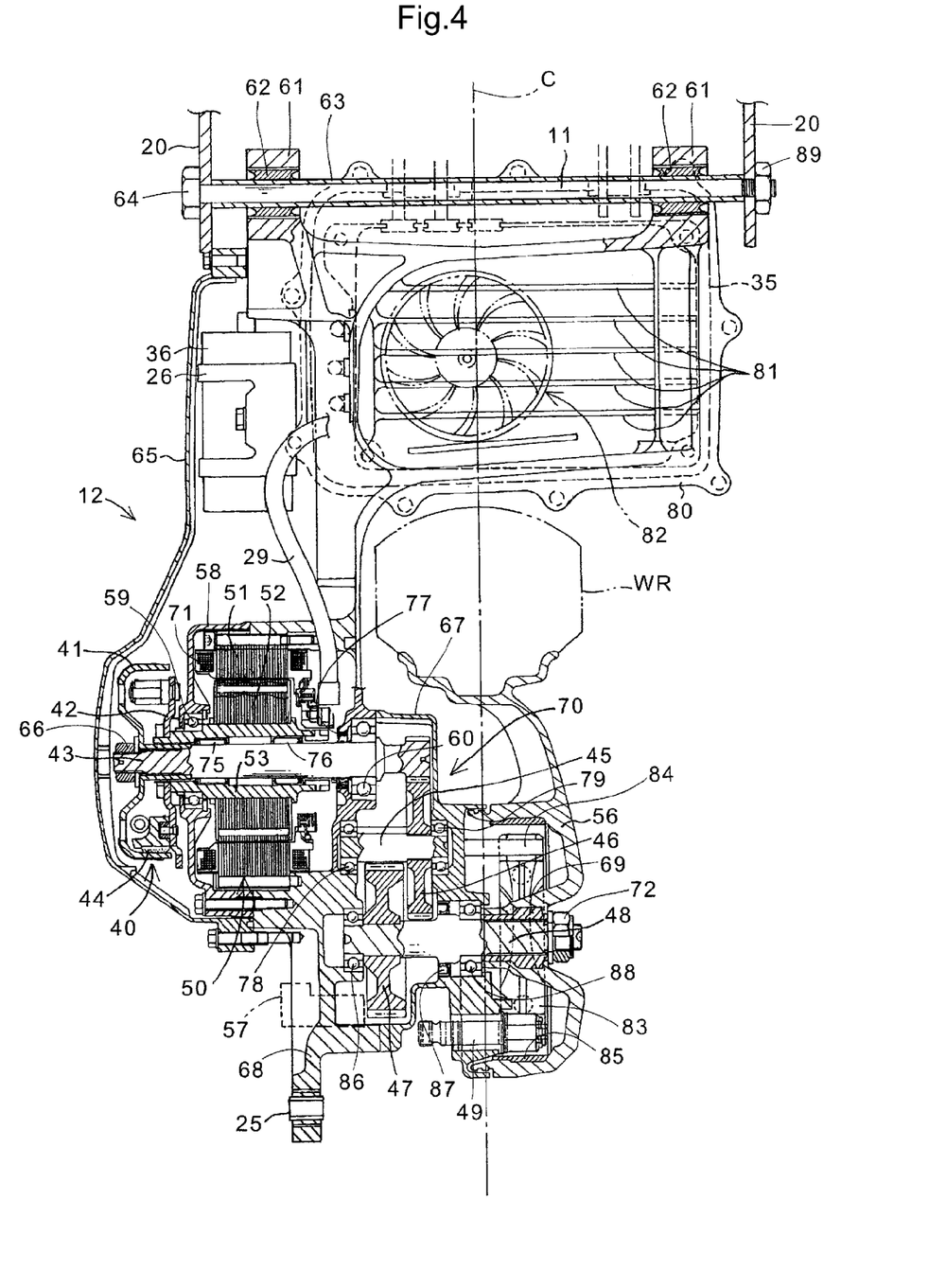
FIG. 4 is a cross-sectional view illustrating the swing arm.
Figure 5:
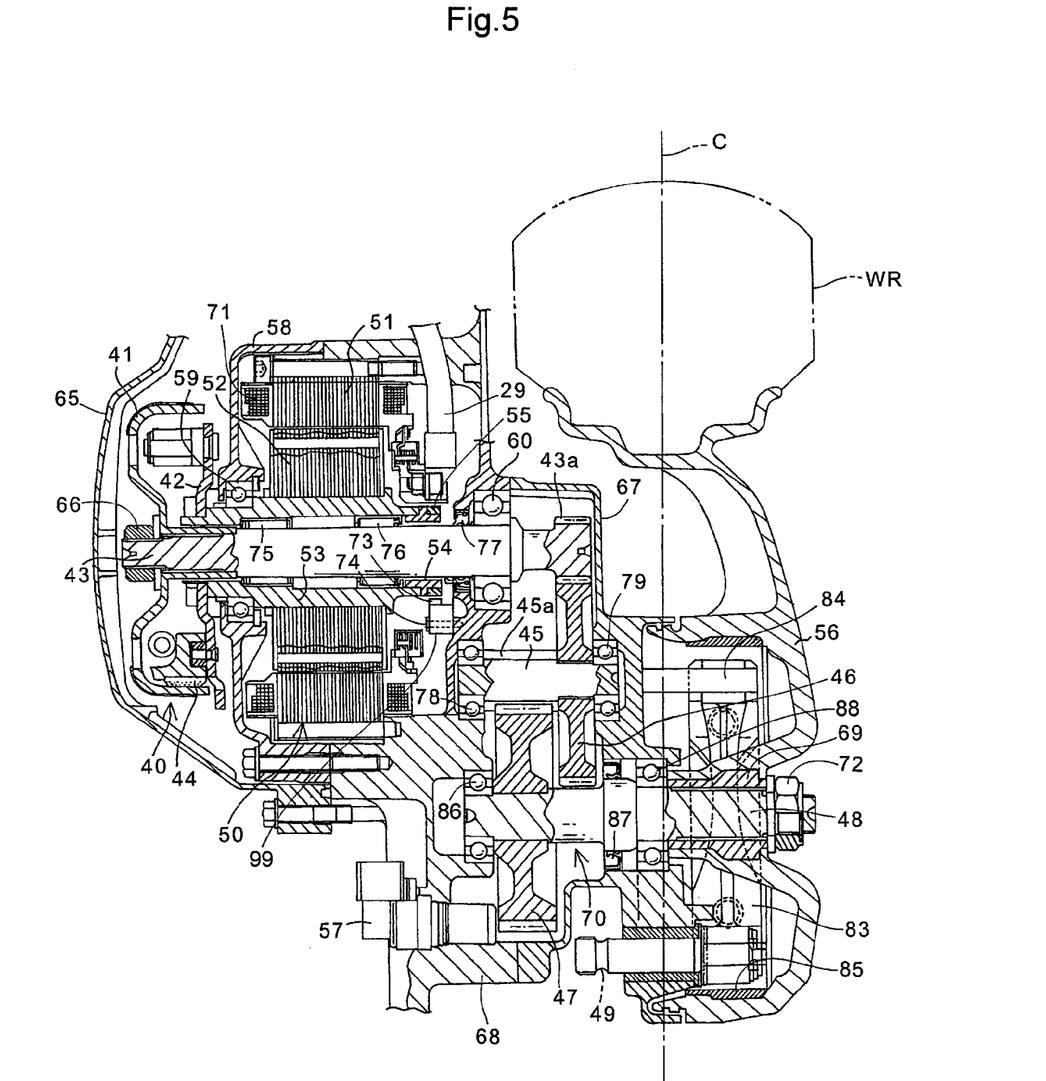
FIG. 5 is a partially enlarged view of FIG. 4.

FIG. 4 is a cross-sectional view illustrating the swing arm 12 when seen from the topside of the vehicle body. Further, FIG. 5 is a partially enlarged view of FIG. 4. The same reference numerals respectively denote the same or equivalent components. The swing arm 12 is swingably journaled to a pair of left and right pivot plates 20 through a swing arm pivot (a pivot shaft) 11. A pivot shaft 11 is an elongated bolt with a screw head 64, and is fixed by a right nut 89 in the width direction of the vehicle while being fitted into a cylindrical collar 63 which is supported by a boss 61 near the swing arm 12 through a bush 62. Furthermore, the bush 62 is welded to a cylindrical collar 63, and a collar member with a small thickness is welded to the outer periphery of the bush 62. Then, the collar member and the bush 62 are press-inserted into a penetration hole of the boss 61, so that the position of the swing arm 12 in the width direction of the vehicle is defined.

A wide casing 80 is provided at the front side of the vehicle body in the swing arm 12 to accommodate the motor driver 35. The cover member 21 (refer to FIG. 3) is attached to the lower surface side of the vehicle body in the wide casing 80. A plurality of heat radiation fins 81 is integrally provided at the upside of the vehicle body in the wide casing 80 to cool the motor driver 35, and an electric fan 82 is disposed at the upside of the vehicle body in the heat radiation fin 81 to improve a cooling effect through compulsory blowing.

The swing arm 12 according to the embodiment is of a cantilever type that journals the rear wheel WR only using the left arm portion, and the electric motor 50, a centrifugal clutch 40 serving as a disconnection/connection mechanism of the rotational driving force, and a speed reducing mechanism 70 are intensively disposed at the rear side of the vehicle body in the arm portion.

The electric motor 50 is configured as an inner rotor type including a stator 51 which is fixed to the inner wall of the swing arm 12 and has a stator coil 71 and a rotor 52 which is fixed to a motor driving shaft 53. The left side of the cylindrical motor driving shaft 53 shown in the drawing is journaled through a bearing 59 of a stator cover 58 attached to the inner wall of the swing arm 12 to cover the electric motor 50. Further, a cylindrical collar 54 is attached to the right end portion of the motor driving shaft 53 shown in the drawing to support a magnetic body 55 as a detected subject of a motor revolution sensor 99. The motor revolution sensor 99 with a detector 73 is fixed to the inner wall surface of the swing arm 12 through an attachment screw 74.

An output shaft 43 is supported at the right side of the electric motor 50 shown in the drawing through a bearing 60 fitted to a power transmission casing 68 of the swing arm 12. Further, as described above, the motor driving shaft 53 is supported at the left side of the electric motor 50 shown in the drawing through the bearing 59. Accordingly, the motor driving shaft 53 and the output shaft 43 are supported at two points at the left and right sides of the electric motor 50 in the width direction of the vehicle. For example, compared to a one-sided one-point support structure, the bearings 59 and 60 may be made small. Furthermore, an oil seal 77 is disposed at the left side of the bearing 60 shown in the drawing.

A centrifugal clutch 40 includes a drive plate 42 which is provided with a clutch shoe 44 and a clutch outer 41 which is rotated by a friction force of the clutch shoe 44. The drive plate 42 is fixed to the left end portion of the motor driving shaft 53 shown in the drawing, and the clutch outer 41 is fixed to the output shaft 43, rotatably inserted through the motor driving shaft 53, through a nut 66. Furthermore, the motor driving shaft 53 and the output shaft 43 are configured to be rotatable relative to each other through two needle roller bearings 75 and 76.

Then, the centrifugal clutch 40 has a configuration in which the clutch shoe 44 moves outward in the radial direction to generate a friction force when the motor driving shaft 53 rotates at a predetermined revolution or more, that is, the drive plate 42 rotates at a predetermined revolution or more, so that the clutch outer 41 is rotated by the friction force. Accordingly, a rotational driving force of the electric motor 50 is transmitted to the output shaft 43.

The rotational driving force transmitted to the output shaft 43 is transmitted to a final output shaft 48 (the axle 19) through a speed reducing mechanism 70. Specifically, the rotational driving force is transmitted to the final output shaft 48 which is fixed to the second speed reducing gear 47 and is rotatably journaled through a bearing 86 fitted to the power transmission casing 68 and a bearing 88 fitted to a speed reducing gear casing 67 after the rotational driving force is transmitted via the first speed reducing gear 46 which meshes with the speed reducing gear 43a provided in the right end portion of the output shaft 43 shown in the drawing, a first speed reducing shaft 45 which is fixed to the first speed reducing gear 46 and is rotatably journaled through a bearing 78 fitted to the speed reducing gear casing 67 and a bearing 79 fitted to the power transmission casing 68, and the second speed reducing gear 47 which meshes with a speed reducing gear 45a provided in the first speed reducing shaft 45.

A wheel 56 of the rear wheel WR is fixed to the right end portion of the final output shaft 48 shown in the drawing through a collar 69 by a nut 72. A brake drum with a liner 85 is formed at the inner diameter side of the wheel 56, and a pair of upper and lower brake shoes 83 is accommodated therein which is driven by a brake cam 49 about an anchor pin 84. Furthermore, an oil seal 87 is disposed at the left side of the bearing 88 shown in the drawing. Further, an integral swing arm casing 65 is attached to the outside of the smoothing capacitor 36 or the centrifugal clutch 40 in the width direction of the vehicle.

As described above, according to the electric vehicle of the present invention, since the centrifugal clutch 40 is provided between the electric motor 50 and the speed reducing mechanism 70 so that the clutch starts to transmit a rotational driving force when the electric motor 50 rotates at a predetermined revolution or more, no load is applied to the electric motor 50 until the electric motor 50 rotates at a predetermined revolution or more, so that the electric motor 50 may smoothly start to rotate. Accordingly, even when the weight of the vehicle is large or the electric vehicle starts to move on a sloping road, the electric vehicle may smoothly start to move. Further, since the centrifugal clutch 40 is disconnected until the electric motor 50 rotates at a predetermined revolution or more, there is no concern that a load is generated due to the rotational resistance of the electric motor 50 when a rider walks pushing the vehicle body.

Further, as shown in the drawing, the constituents of the rotational driving force transmission system are disposed from the left side in the width direction of the vehicle in an order of the centrifugal clutch 40, the electric motor 50, and the speed reducing mechanism 70. Accordingly, the electric motor 50 may be disposed near the center in the width direction of the vehicle by disposing the speed reducing mechanism 70 at the recess-like space of the wheel 56 shown in the drawing. Further, since the centrifugal clutch 40 is disposed at the left side of the electric motor 50 shown in the drawing, the centrifugal clutch 40 with an outer diameter smaller than that of the electric motor 50 is disposed at the left end of the vehicle body, and the projection amount of the swing arm 12 toward the side portion of the vehicle body may be reduced.

Furthermore, a non-contact type vehicle speed sensor 57 is closely disposed at the left side of the second speed reducing gear 47 shown in the drawing while facing the right side to detect a vehicle speed on the basis of the rotation speed of the second speed reducing gear 47.

Figure 6:
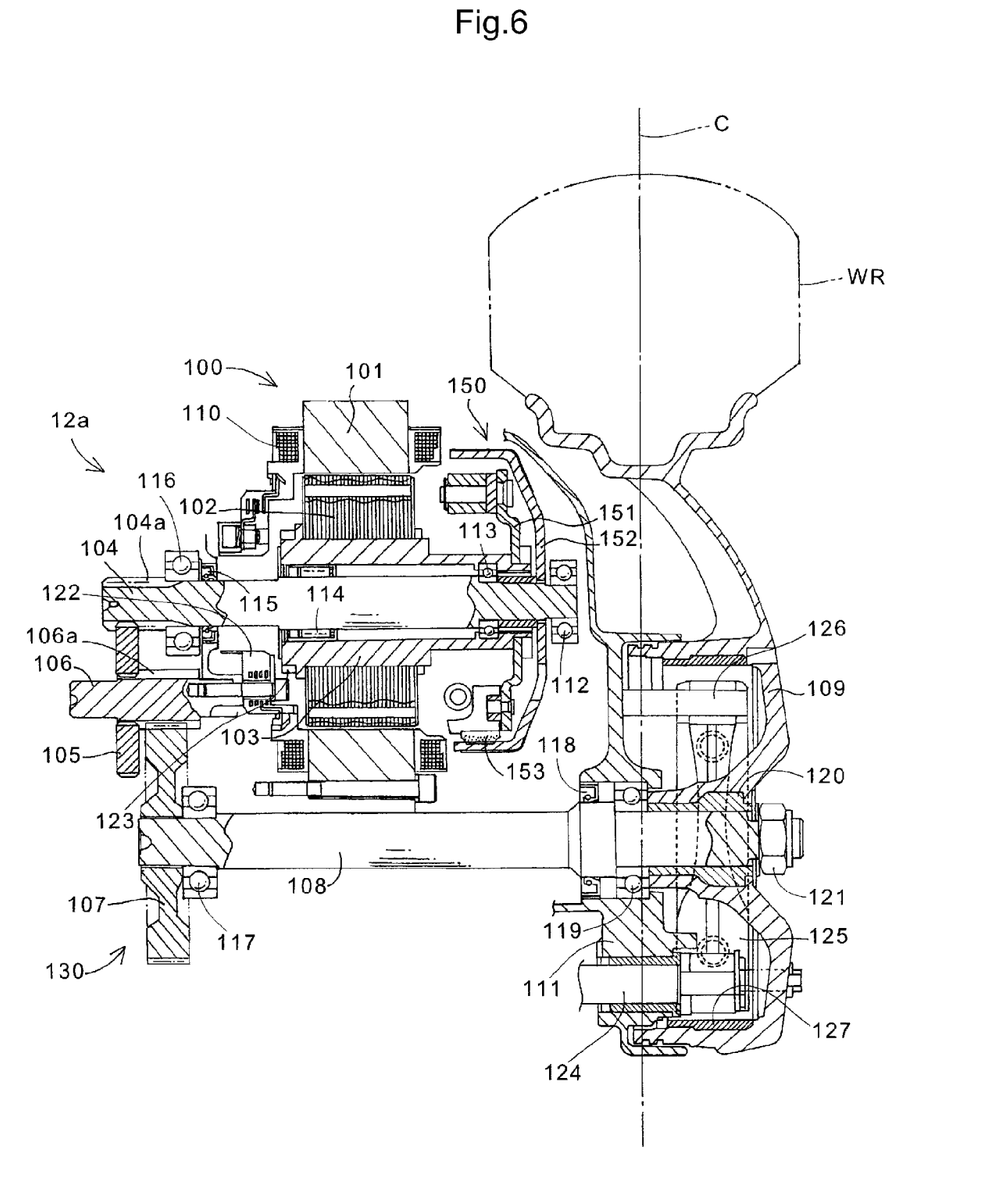
FIG. 6 is a cross-sectional view illustrating a swing arm according to a second embodiment of the present invention.

FIG. 6 is a cross-sectional view illustrating a swing arm 12a according to a second embodiment of the present invention. The second embodiment is characterized in that an electric motor 100, a centrifugal clutch 150, and a speed reducing mechanism 130 are disposed in the width direction of the vehicle in an order different from that of the first embodiment. Specifically, the speed reducing mechanism 130, the electric motor 100, and the centrifugal clutch 150 are disposed in this order from the left side of the width direction of the vehicle.

The electric motor 100 is configured as an inner rotor type including a stator 101 which is fixed to an inner wall of the swing arm 12a and a rotor 102 which is fixed to a motor driving shaft 103 and has a stator coil 110. The centrifugal clutch 150 includes a drive plate 151 which is provided with a clutch shoe 153 and a clutch outer 152 which is rotated by a friction force of the clutch shoe 153. The drive plate 151 is fixed to the left end portion of the motor driving shaft 103 shown in the drawing, and the clutch outer 152 is fixed to an output shaft 104 rotatably inserted through the motor driving shaft 103. The motor driving shaft 103 and the output shaft 104 are configured to be rotatable relative to each other through a needle roller bearing 114 and a ball bearing 113. Further, the output shaft 104 is supported by bearings 112 and 116 fitted to a power transmission casing (not shown). An oil seal 115 is disposed at the right side of the bearing 116 shown in the drawing. A magnetic body 123 as a detected subject of a motor revolution sensor 122 is attached to the left end portion of the motor driving shaft 103 shown in the drawing.

Then, the centrifugal clutch 150 has a configuration in which the clutch shoe 153 moves outward in the radial direction to generate a friction force when the motor driving shaft 103 rotates at a predetermined revolution or more, that is, the drive plate 151 rotates at a predetermined revolution or more, so that the clutch outer 152 is rotated by the friction force. Accordingly, a rotational driving force of the electric motor 100 is transmitted to the output shaft 104.

The rotational driving force transmitted to the output shaft 104 is transmitted to a final output shaft 108 through the speed reducing mechanism 130. Specifically, the rotational driving force is transmitted to the final shaft 108 which is fixed to a second speed reducing gear 107 and is rotatably journaled by bearings 117 and 119 fitted to a speed reducing gear casing 111 after the rotational driving force is transmitted via a first speed reducing gear 105 which meshes with a speed reducing gear 104a formed at the left end of the output shaft 104 shown in the drawing, a first speed reducing shaft 106 fixed to the first speed reducing gear 105, and a second speed reducing gear 107 which meshes with a speed reducing gear 106a formed in the first speed reducing shaft 106. A wheel 109 of the rear wheel WR is fixed to the right end portion of the final output shaft 108 shown in the drawing through a collar 120 by a nut 121. An oil seal 118 is disposed at the left side of the bearing 119 shown in the drawing. A brake drum with a liner 127 is formed at the inner diameter side of the wheel 109, and a pair of upper and lower brake shoes 125 is accommodated therein which is driven by a brake cam 124 about an anchor pin 126.

As described above, according to the electric vehicle of the second embodiment of the present invention, the electric motor 100 may be disposed near the center in the width direction of the vehicle by disposing the centrifugal clutch 150 at the space of the recess of the rear wheel WR. Further, since the speed reducing mechanism 130 is disposed at the left side of the electric motor 100 in the drawing, the projection amount of the swing arm toward the side portion of the vehicle body may be made small.

Furthermore, the shapes or the structures of the swing arm, the electric motor, the speed reducing mechanism, and the centrifugal clutch or the like are not limited to the above-described embodiment, but may be modified into various forms. For example, the disconnection/connection mechanism between the electric motor and the speed reducing mechanism may be configured as an electromagnetic clutch or the like. Further, the cantilever arm portion of the swing arm may be formed at the right side in the width direction of the vehicle. The electric vehicle according to the present invention is not limited to the auto bicycle, but may be applied to a tricycle or a quadricycle.

REFERENCE SIGNS LIST

1: ELECTRIC VEHICLE,
2: MAIN FRAME,
3: HEAD PIPE,
5: LOWER FRAME,
11: SWING ARM PIVOT,
12: SWING ARM,
17: LOADING ROOM,
18: CENTER STAND,
20: PIVOT PLATE,
30: LOW-VOLTAGE BATTERY,
31: HIGH-VOLTAGE BATTERY,
32: DC-DC CONVERTER,
33: CONTACTOR BOX,
34: CONTROL DEVICE (MGU),
35: MOTOR DRIVER,
40: CENTRIFUGAL CLUTCH (DISCONNECTION/CONNECTION MECHANISM),
41: CLUTCH OUTER,
42: DRIVE PLATE,
43: OUTPUT SHAFT,
44: CLUTCH SHOE,
50: ELECTRIC MOTOR,
51: STATOR,
52: ROTOR,
53: MOTOR DRIVING SHAFT,
70: SPEED REDUCING MECHANISM,

The invention claimed is:

1. An electric vehicle comprising:
a swing arm (12) which is swingably journaled to a vehicle body frame and rotatably journals a rear wheel (WR);
an electric motor (50) which is disposed inside said swing arm (12) to overlap said rear wheel (WR) in a side view of the vehicle body and supplies a rotational driving force to the rear wheel (WR);
a disconnection/connection mechanism (40) which is provided on a transmission mechanism transmitting the rotational driving force from said electric motor (50) to said rear wheel (WR) to disable transmission of the rotational driving force until said electric motor (50) rotates at a predetermined revolution or more when the vehicle starts to move;
wherein said disconnection/connection mechanism (40) is provided outside of said rear wheel (WR) in the width direction of the vehicle and outside of said electric motor (50) in the width direction of the vehicle;

wherein the rotational driving force of said electric motor (50) is transmitted to a speed reducing mechanism (70) through said disconnection/connection mechanism (40), and is transmitted from said speed reducing mechanism (70) to said rear wheel (WR);

wherein a wheel (56) of said rear wheel (WR) has a recess-like space inside in the radial direction of a rim of said wheel;

wherein said speed reducing mechanism (70) is provided to be configured to be put within the recess-like space of said wheel (56); and wherein said electric motor (50) is provided to be configured to overlap the rim of said wheel (56) of said rear wheel (WR) in a side view of the vehicle body.

2. The electric vehicle according to claim 1, wherein the rotational driving force of said electric motor (50) is transmitted to a reducing mechanism (70) through said disconnection/connection mechanism (40), and is transmitted from said speed reducing mechanism (70) to said rear wheel (WR), and wherein said speed reducing mechanism (70) is provided between said electric motor (50) to said rear wheel (WR).

3. The electric vehicle according to claim 2, wherein said electric motor (50) to said rear wheel (WR) are provided coaxially, and wherein an output shaft (43) which transmit the rotational driving force of said electric motor (50) is connected to said speed reducing mechanism (70) through said electric motor (50) in the width direction of the vehicle.

4. The electric vehicle according to claim 1, wherein the disconnection/connection mechanism (40) is a centrifugal clutch (40).

5. The electric vehicle according to claim 4, wherein said electric motor (50) is an inner rotor type motor which includes a stator (51) fixed to said swing arm (12) and a rotor (52) fixed to a cylindrical motor driving shaft (53), wherein said centrifugal clutch (40) includes a drive plate (42) which is provided with a clutch shoe (44) of said centrifugal clutch (40) and a clutch outer (41) which is rotated by a friction force of said clutch shoe (44), said drive plate (42) is fixed to one end of said motor driving shaft (53), an output shaft (43) having said clutch outer (41) fixed thereto is rotatably inserted through said motor driving shaft (53), and said output shaft (43) is configured to transmit the rotational driving force to said speed reducing mechanism (70).

6. The electric vehicle according to claim 4, wherein said swing arm (12) is a cantilever type provided only at the left side in the width direction of the vehicle, and said centrifugal clutch (40), said electric motor (50), and said speed reducing mechanism (70) are provided in this order from the left side of said swing arm (12) in the width direction of the vehicle.

7. The electric vehicle according to claim 2, wherein said speed reducing mechanism (70) comprises combination of a plurality of gears.

8. An electric vehicle comprising:

a swing arm (12a) which is swingably journaled to a vehicle body frame and rotatably journals a rear wheel (WR);

an electric motor (100) which is disposed inside said swing arm (12a) to overlap said rear wheel (WR) in a side view of the vehicle body and supplies a rotational driving force to the rear wheel (WR); and a disconnection/connection mechanism (150) which is provided on a transmission mechanism transmitting the rotational driving force from said electric motor (100) to said rear wheel (WR) to disable transmission of the rotational driving force until said electric motor (100) rotates at a predetermined revolution or more when the vehicle starts to move;

wherein said disconnection/connection mechanism (150) is a centrifugal clutch, wherein said swing aim (12a) is of a cantilever type provided only at the left side in the width direction of the vehicle, and said speed reducing mechanism (130), said electric motor (100), and said centrifugal clutch (150) are provided in this order, from the left side of said swing aim (12a) in the width direction of the vehicle.

9. The electric vehicle according to claim 1, further comprising:

a stator cover (58) which is fixed to said swing aim (12) and covers said stator (51), wherein said stator cover (58) is provided with a bearing (59), and wherein said output shaft (43) is supported at two points on the left and right sides of said electric motor (50) in the width direction of the vehicle through a bearing (60) formed at said swing arm (12) at one side of said electric motor (50) in the width direction of the vehicle and said bearing (59) formed at said stator cover (58).

10. The electric vehicle according to claim 1, comprising:

an output shaft (43) which transmits a rotational driving force of said electric motor (50), an end output shaft (49) which is an axle of the rear wheel, and a speed reducing shaft (45) comprised said speed reducing mechanism (70), wherein said speed reducing shaft (45) is provided between said output shaft (43) and said end output shaft (49), wherein sad speed reducing shaft (45) is provided at the lower than said output shaft (43) and said end output shaft (48) in a side view of the vehicle body.

11. The electric vehicle according to claim 1, wherein said swing aim (12) is swingably journaled to pair of left and right pivot plates (20) with a swing arm pivot (11), wherein said electric motor (50) is provided to both ends of said swing arm pivot (11).

12. The electric vehicle according to claim 2, wherein the disconnection/connection mechanism (40) is a centrifugal clutch (40).

13. The electric vehicle according to claim 5, wherein said swing arm (12) is a cantilever type provided only at the left side in the width direction of the vehicle, and said centrifugal clutch (40), said electric motor (50), and said speed reducing mechanism (70) are provided in this order from the left side of said swing aim (12) in the width direction of the vehicle.

14. The electric vehicle according to claim 3, wherein said speed reducing mechanism (70) comprises combination of a plurality of gears.

15. The electric vehicle according to claim 2, further comprising:

a stator cover (58) which is fixed to said swing arm (12) and covers said stator (51), wherein said stator cover (58) is provided with a bearing (59), and wherein said output shaft (43) is supported at two points on the left and right sides of said electric motor (50) in the width direction of the vehicle through a bearing (60) formed at said swing arm (12) at one side of said electric motor (50) in the width direction of the vehicle and said bearing (59) formed at said stator cover (58).

\* \* \* \* \*